United States Patent [19]

Ugon

[11] 4,211,919
[45] Jul. 8, 1980

[54] PORTABLE DATA CARRIER INCLUDING A MICROPROCESSOR

[75] Inventor: Michel Ugon, Saint-Ouen, France

[73] Assignee: Compagnie Internationale pour l'Informatique, Paris, France

[21] Appl. No.: 936,694

[22] Filed: Aug. 25, 1978

[30] Foreign Application Priority Data

Aug. 26, 1977 [FR] France ................. 77 26107

[51] Int. Cl.² .......................................... G06K 19/06
[52] U.S. Cl. ..................... 235/487; 235/488
[58] Field of Search ................ 235/488, 487

[56] References Cited

U.S. PATENT DOCUMENTS

| | | | |
|---|---|---|---|
| 3,702,464 | 11/1972 | Castrucci | 340/173 SP |
| 3,868,057 | 2/1975 | Chavez | 235/492 |
| 3,876,865 | 4/1975 | Bliss | 235/488 |
| 3,894,756 | 7/1975 | Ward | 283/7 |
| 3,919,447 | 11/1975 | Kilmer, Jr. et al. | 428/138 |
| 4,001,550 | 1/1977 | Schatz | 235/487 |
| 4,004,133 | 1/1977 | Hannon et al. | 235/487 |
| 4,007,355 | 2/1977 | Moreno | 235/487 |
| 4,092,524 | 5/1978 | Moreno | 235/487 |
| 4,105,156 | 8/1978 | Dethloff | 235/487 |

*Primary Examiner*—Daryl W. Cook
*Attorney, Agent, or Firm*—Kerkam, Stowell, Kondracki & Clarke

[57] ABSTRACT

A portable data or information carrier in the form of a card or the like. In order to maximize the confidentiality of information stored in the carrier, and more specifically to limit the amount of information available to a would-be defrauder monitoring data lines connecting the data carrier to external devices, the data carrier includes a microprocessor and a memory operatively associated with the microprocessor. The memory has three particular zones, namely: (1) a secret zone in which reading and writing operations only by internal circuits of the data carrier are permitted; (2) a working zone in which any reading or writing operations are permitted; and (3) a read zone where only reading operations are permitted. The secret zone of the memory includes at least one key or code which is compared to a key received from a device external to the data carrier to determine whether a particular operation is authorized. To ensure that the data carrier consumes the same amount of current whether the requested operation is authorized or unauthorized, a bit is stored in the memory in either event. In general, the internal handling of data by the data carrier deprives a would-be defrauder of any opportunity to learn the nature of information required to use the data carrier.

3 Claims, 10 Drawing Figures

| LOCK | LP | EP | ERROR | | |
|------|-----|------|--------|--------|--------|
| ERROR | | DEBE | ACCESS | | |
| ACCES | | DEBAC | FULL | KEY N°1 | VAL K1 |
| KEY N°2 | | VALK2 | | | |

PART 0

ADT →

PART 1

ADL →

| VAL | U₁ | ADT | ADL | TOTAL |
|-----|----|-----|-----|-------|
| VAL | | | | NAME |
| VAL | | | | BANK |
| VAL | | | | BANK |
| VAL | | | | BANK |
| | | | | TYPE |
| | | | | SERIAL N° |

PART 2

FIG 4B

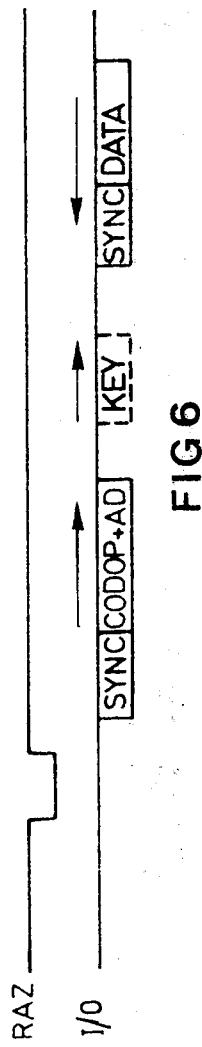
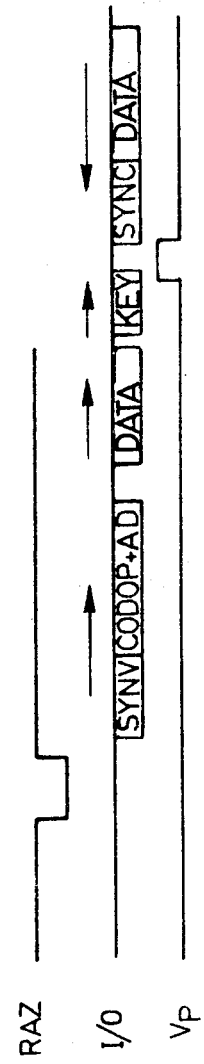

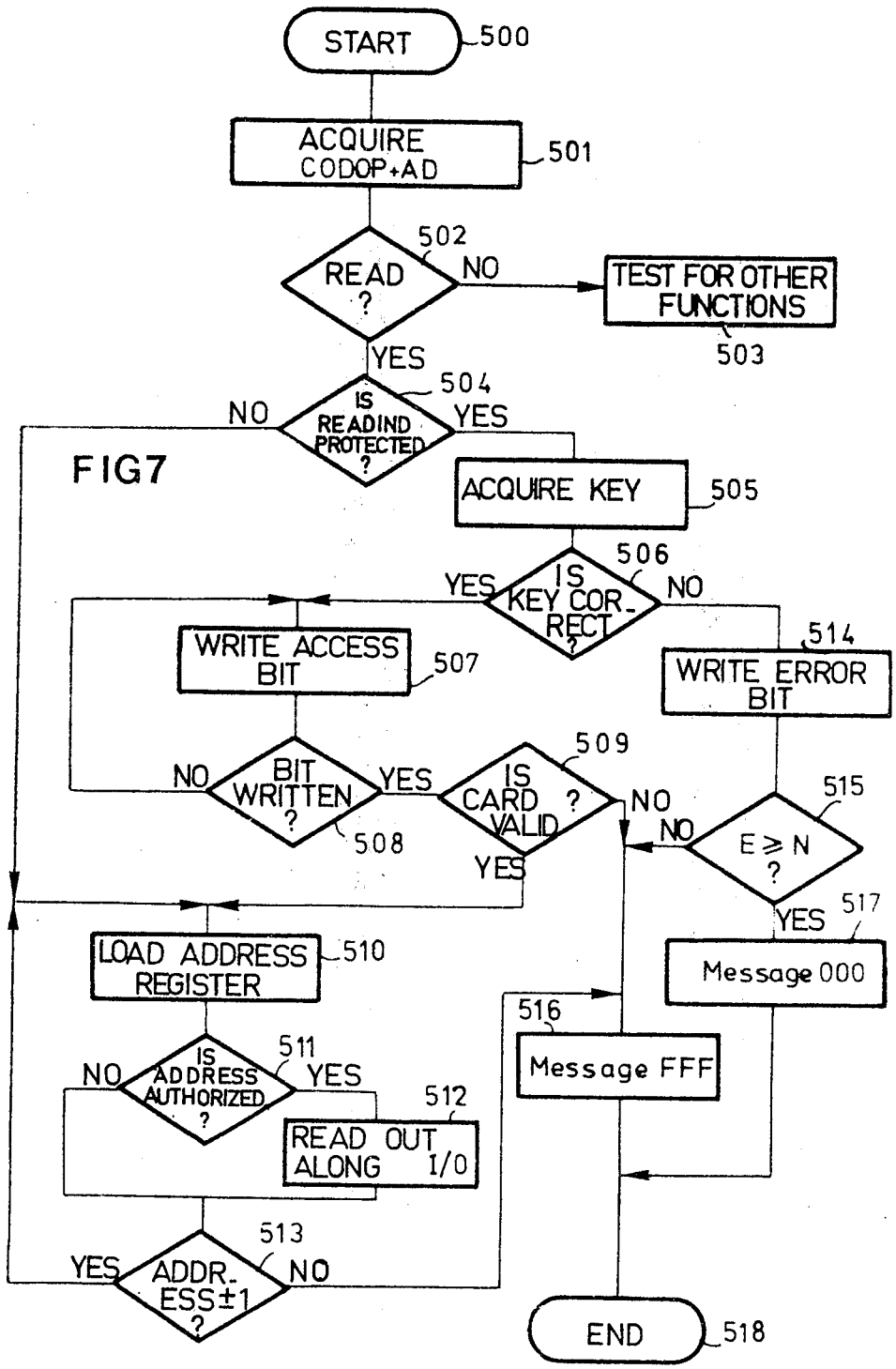

PORTABLE DATA CARRIER INCLUDING A MICROPROCESSOR

BACKGROUND AND BRIEF SUMMARY OF THE INVENTION

The present invention relates to a carrier for confidential or non-confidential data which is both easy to manipulate and easy to transport.

There are a number of known carriers for confidential data. Such carriers may take the form of cards having magnetically or optically readable information encoded thereon. Examples are disclosed in U.S. Pat. Nos. 3,894,756 and 3,919,447. Alternatively, the cards may include electrical circuit elements in the form of integrated circuits. Examples of this general type of data carrier are disclosed in U.S. Pat. Nos. 3,702,464; 3,868,057; 3,876,865; 4,001,550; 4,004,133; and 4,007,355.

Although the last-mentioned type of data carrier is sophisticated, it has the major drawback that it uses specific electronic circuits of set structure which perform a single function determined by the use for which the carrier is intended.

Access to the data is generally obtained by means of a key or code stored in the data carrier and known only to the owner of the carrier. Safeguards are thus provided in the carrier itself which bar access to the data carrier when an attempt is made to gain access using an incorrect key. However, the incorporation of these safeguards in carriers for confidential data known hitherto generally means that dialogues of differnet types take place between the data carrier and the operating apparatus connected to it depending on whether the key used is of the right or wrong type, so that it is perfectly possible for a clever defrauder to tap the data lines connecting the carrier to the operating apparatus and discover the keys which give access to the said data carrier.

Accordingly, it is a first object of the invention to provide a data carrier which has an easily programmable electronic structure and which is able to perform a multitude of functions without it being necessary to endow it with special electronic structures.

It is a second object of the invention to provide a data carrier or card, which may or may not be made specific to an individual, and which may contain both information of a general nature and information of a confidential nature and which includes processing elements for the internal management of the data contained in the data carrier and for the external management of exchanges of data with the operating apparatus connected to the said carrier, the external transaction of exchanges with the operating apparatus apparently remaining the same in the event of anomalies or illicit use whether the key is correct or incorrect.

To be more exact, the data carrier according to the invention is a portable article of small size associated with an electronic arrangement comprising a microprocessor having an electrically programmable read-only memory, the memory characterized in that it has three zones:

(1) a first or secret zone in which only internal reading and writing by the circuits of the data carrier is permitted;

(2) a second or working zone in which any reading and writing operations are permitted; and (3) a third or read zone where only read operations ordered by electronic devices internal or external to the data carrier are permitted.

The memory is further characterized in that it includes, in the secret zone, an ERROR zone and an ACCESS zone in which information indicating attempted access or access to strictly confidential data requiring the use of a key is stored. The microprogram stores one bit in one or the other of these two zones each time access to the data carrier is requested.

With the arrangement of the invention, it is thus possible to perform read and write functions in predetermined zones of the memory provided that a secret code or key which will be recognized by the arrangement itself is fed into the data carrier.

The operations to be performed are monitored and handled internally and continuously by means of a microprogram which is recorded in the memory of the microprocessor and which is specific to each application. The internal handling thus deprives a would-be defrauder of any opportunity to learn the nature of the information required to use the data carrier.

More particularly, the facilities provided by the complete portable assembly of the invention may be used for:

(1) storing and processing changing financial data;

(2) controlling access to secret or restricted information; and/or (3) making up a portable confidential or non-confidential file with the opportunity for internal sorting of various kinds of processing.

BRIEF DESCRIPTION OF THE DRAWINGS

The features and advantages of the invention will become clearly apparent from the following description, with reference to the accompanying drawings in which:

FIGS. 4A and 4B show one organization for the data content of the data carrier of the invention;

FIGS. 6 and 7 illustrate the operation of the carrier in the memory read out mode; and FIGS. 8 and 9 illustrate operation in the memory write mode.

DETAILED DESCRIPTION OF THE PREFERRED EMBODIMENTS

Figure 1:
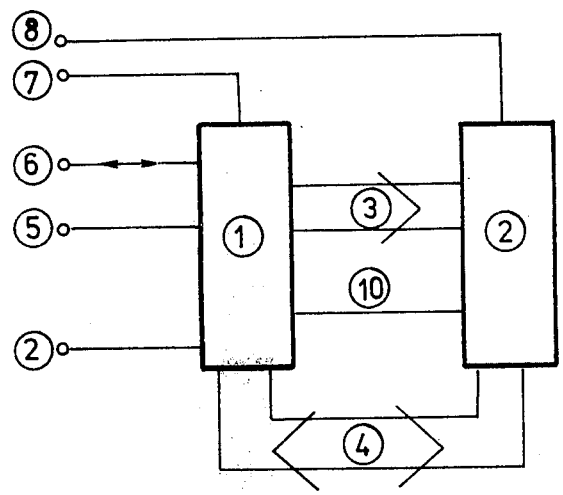
FIGS. 1 and 2 each show an embodiment of the electronic circuits of the data carrier according to the invention.

FIG. 1 shows a first embodiment of the electronic circuits. A microprocessor 1 is supplied between a ground (GND) terminal 9 and a supply voltage ($V_{cc}$) terminal 7 by a regulated voltage from an external source (not shown). An electrically programmable read-only memory (PROM) 2 is similarly supplied between the ground terminal 9 and a supply voltage ($V_p$) terminal 8. This arrangement enables a write voltage to be applied to $V_p$ terminal 8 while $V_{cc}$ terminal 7 remains at a constant potential to supply the microprocessor. The capacity of the memory 2 may be between 4096 and 8192 bits, which is adequate for the applications envisaged. These capacities are not, however, intended to limit the scope of the claimed invention.

The microprocessor 1 exerts complete control over the memory 2 by means of an address buss 3 and a data buss 4.

A clock (CLK) input terminal 5 enables the various internal activities of the arrangement to be synchronized with the exterior. Clock (CLK) pulses may have a frequency in the order of 0.5 to 5 megahertz.

A serial in/out (I/O) terminal 6 provides the only means of access to the arrangement for ingoing and outgoing data. The microprocessor 1 manages dialogues by serializing or deserializing the data depending upon the direction of transfer.

If a read out request reaches the microprocessor from terminal 6, access is authorized after various checks described in detail hereinafter. In the read phase proper, the address is fed along the address buss 3 and the data is read out on the data buss 4.

If a write request reaches the arrangement from terminal 6, access is authorized after checking. The address is fed along buss 3 and the data along buss 4. The write order is transmitted to the memory 2 along a line 10 simultaneously with the write voltage at terminal 8.

Figure 2:
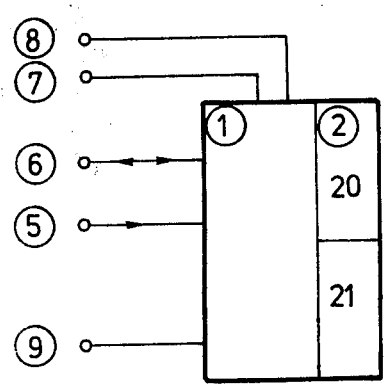

FIG. 2 shows a second embodiment of the electronic circuits. In FIG. 2, the microprocessor 1 contains an internal non-volatile memory 2. This memory is divided into two zones, 20 and 21. Zone 20 contains the operating program for the microprocessor. Zone 21 is used to store data.

In this embodiment, the various supply voltages and the clock pulses (CLK) are applied to the microprocessor 1, as in the FIG. 1 embodiment. The busses 3 and 4 of the FIG. 1 embodiment are now internal.

Figure 3:
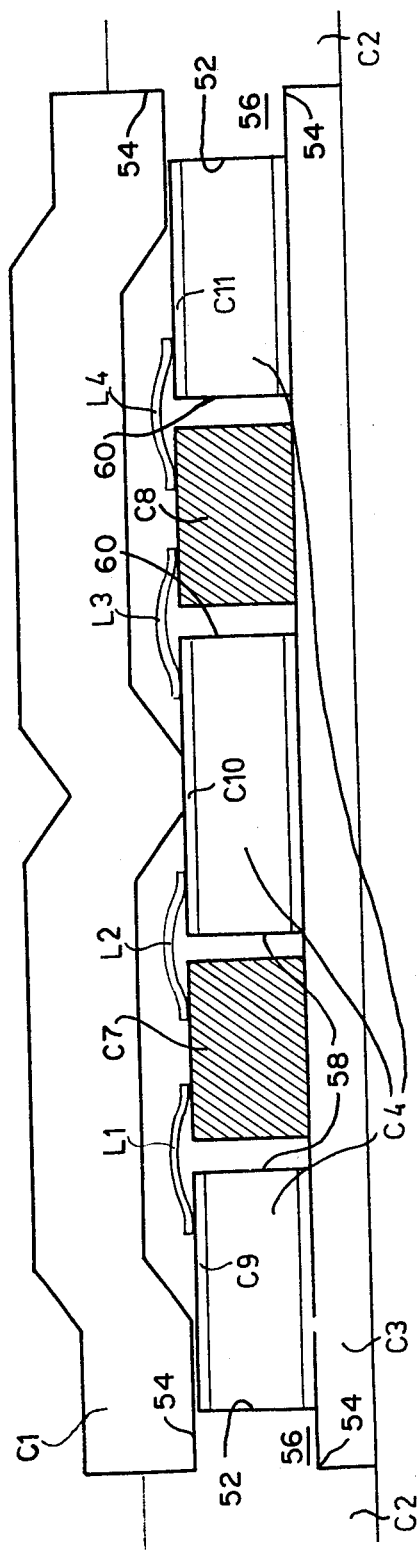
FIG. 3 is a cross sectional view of the data carrier of the invention.

FIG. 3 is a cross-sectional view of an embodiment of the data carrier according to the invention. Into an opening 52 made in a sheet C2 of polyvinyl chloride are fitted two other sheets C1 and C2 of polyvinyl chloride which occupy the entire area of the opening 52 and which rest in recesses 54 provided around the circumference of the opening 52.

A layer C4 of epoxy resin is placed in the space left free by the tongues 56 created by the recesses 54 between the two sheets C1 and C3. Apertures 58 and 60 are formed in the layer C4 as locations for two semiconductor modules. These modules are a microprocessor module C7 in one location and a programmable read-only memory C8 in the other location.

To provide operative electrical connections between the modules C7 and C8 and to external operating apparatus, conductive wires C9, C10 and C11 are applied to the epoxy resin C4. Bowed conductors L1 and L4 then make connection between the wires C9 to C11 and the modules C7 and C8. The conductive wires C9, C10 and C11 are held in position by the polyvinyl sheet C1. Faces of the modules C7 and C8 opposite from the face from which the conductors originate are pressed against the polyvinyl sheet C3. An embodiment of the connections between the data carrier and an external operating apparatus will be found in French patent application No. 75 40361, and corresponding U.S. application Ser. No. 751,954, filed Dec. 17, 1976, by Bernard Badet et al, the entire disclosure of which is hereby incorporated by reference.

Figure 4A:
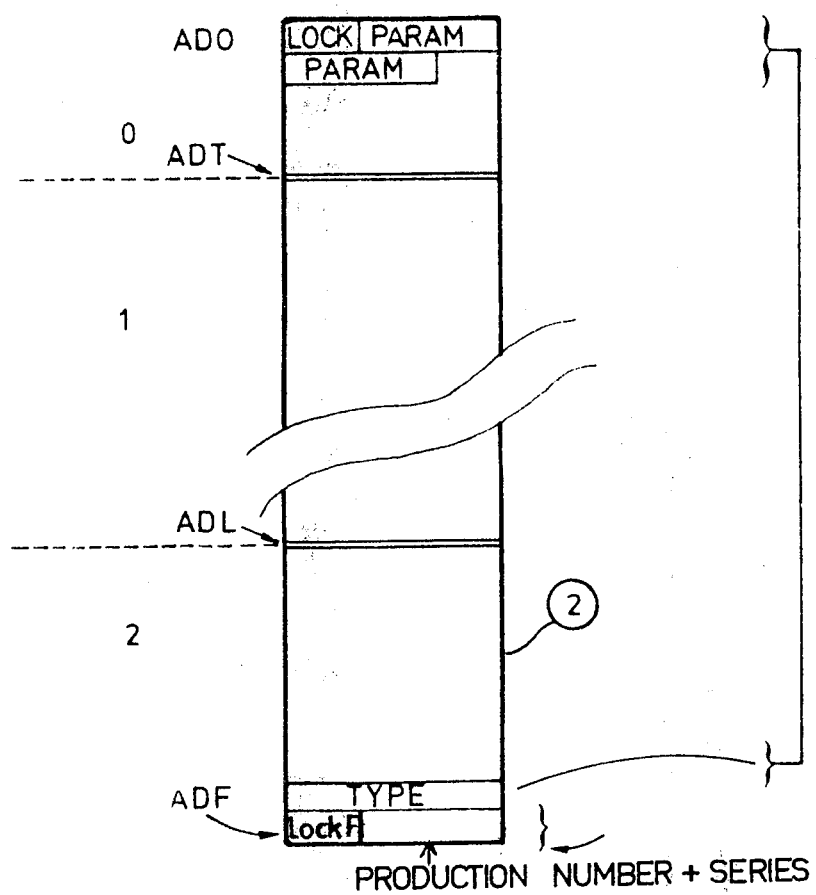

FIG. 4A is a diagram of the organization of the data content of a data carrier according to the invention. In order to make the data carrier suitable for all kinds of use, two kinds of microprocessor memory organization are provided.

The first memory organization is a physical organization and is a function of the particular microprocessor. The second memory organization is a logic organization and fulfills the needs of the particular use to which the data carrier is put. The microprocessor is responsible for correlating these two kinds of organization.

In normal operation the physical memory is in three parts, 0, 1 and 2.

The physical memory Part 0 begins at an address AD0 and ends at an address ADT-1. It represents the secret part of the memory in which any external reading and writing are forbidden and where only internal reading and writing is permitted.

The physical memory Part 1 begins at an address ADT and ends at an address ADL-1. It serves as a working memory for the microprocessor and all internal or external reading and writing operations are permitted.

The physical memory Part 2 begins at an address ADL and ends at an address ADF. In this part of the memory any external or internal writing is forbidden, but internal or external reading is permitted.

The logic memory is subdivided into a creation memory and a utilization memory. The utilization memory is in turn divided into two parts, a defining memory and an application memory.

To be operational, the data carrier, at the time when it is issued, needs to contain information enabling it to be identified. This identifying information is contained in the creation memory which is organized into a plurality of zones beginning at address ADF. Specifically, zones MANF and SER enable the manufacturer of the data carrier and its serial number to be identified. Zone LOCKF validates the content of the creation memory and authorizes writing in it. The zone LOCKF may, for example, be of two-bit size and the following code may be used: If LOCKF=11 any reading and writing is possible in the creation zone. IF LOCKF≠11 the content of the creation zone is validated and any writing operations will be forbidden.

The utilization memory is specific to the use which the user of the data carrier intends to make of it. The size of the various zones will, of course, depend on the intended use.

Considering the utilization memory in more detail, the defining memory part comprises, in the physical memory Part 0, beginning at the physical memory address AD0:

(1) a multi-bit zone LOCK which forbids external access to the defining memory and validates its content, and (2) a zone PARAM whose length depends on the nature of the data carrier and which contains the parameters required to allow the data carrier to operate.

The defining memory further comprises, in the physical memory Part 2:

(3) a zone TYPE to define the function of the data carrier, which may be used as a means of keeping accounts, a meal ticket, an electronic seal, an admission key in hotels, to filing systems, etc.

The application memory is made up of the remaining zones. It can be used as a shared memory, but the conditions governing access to the parts of the physical memory must be respected. Consequently, whatever be the applications to which the data carrier of the invention is put, the secret data will always be located in Part 0, only the data which is to be read will be located in Part 2, and the data to be stored in the normal course of operation of the data carrier will be in Part 1. The format used for the logic data to be stored in the application memory may of course be as desired.

An example of the breakdown of the logic memory will now be given in the context of a financial application with reference being made to FIG. 4B.

In this context, access to the data carrier will require at least two keys. If banking operations are involved, a Key No. 1 will identify the bank and a Key No. 2 will identify the customer. The defining memory will then include a TYPE zone containing a code to designate the financial application of the data carrier. The content of the two-bit LOCK zone is coded as follows: If LOCK=11, write access to any part of the memory is only permitted if Key No. 1 is present. In other words, to credit the card, Key No. 1, the banker's key, is required. If LOCK is other than 11, the contents of parts 0 and 2 of the physical memory are validated, and therefore the content of the defining memory part of the logic memory is validated. Access to part 0 and writing in part 2 of the physical memory are forbidden in the absence of Key No. 2, the customer's key.

A zone LP contains two bits. If LP=11, read out is not protected and is permitted from physical memory Parts 1 and 2 without a key. If LP≠11, read out is protected and a key is required, as described above, to read Parts 1 and 2. This will be the case with the majority of banking operations. To make the operation of the data carrier symmetrical, any read out must be accompanied by an access bit.

A zone EP contains two bits. If EP=11, writing is not protected. In this case, the memory is used as an unprotected storage means. This is the case for example when the memory is blank before the data carrier is imprinted. If EP is other than 11, a key is required to write in Part 1 of the physical memory.

The application memory is made up of the identifying memory and the financial memory. The data in the identifying memory is contained in physical memory Parts 0 and 2. In Part 0, the identifying memory consists in essence of an ERROR memory and an ACCESS memory. The ERROR memory stores an error bit each time the data carrier is operated with a wrong key, the error bits being recorded at ascending addresses. When the overflow zone DEBE is written the data carrier is invalidated.

The ACCESS memory only exists if reading of the data carrier is protected (LP≠11), which will be the case in the majority of banking applications. At each reading operation accompanied by a correct key, the microprocessor writes an access bit after the previous one. When zone DEBAC is reached, the data carrier is invalidated and no reading may take place.

The identifying memory may in addition contain the following zones:

(1) A FULL zone indicating that the card is full and that no writing is possible.

(2) KEY zones containing the codes for the banker's and customer's keys. The banker is allotted KEY No. 1, for example, and the customer is allotted KEY No. 2.

(3) A zone VALK1 which allows the validity of Key No. 1 to be determined. If VALK1≠11, the banker's key is valid.

(4) A zone "VALK2" which enables the validity of Key No. 2 to be determined. If VALK2≠11, the customer's key is valid.

In cases where LOCK is other than 11, KEY No. 1 allows information which may increase the purchasing power of the data carrier, in particular any form of credit, to be written. KEY No. 2, on the other hand is used by the owner of the data carrier to validate debiting operations (protected reading or writing).

The identifying memory in Part 2 of the physical memory begins immediately before the zone TYPE of the defining memory, in the direction of descending addresses. This zone of variable length enables data to be stored permanently. It comprises:

(1) an address zone containing a pointer ADT containing the starting address of the working zone and a pointer ADL containing the address of the read out zone;

(2) a zone BANK representing an indication of bank identity and the date of issue of the data carrier;

(3) a zone NAME representing the name of the holder of the data carrier;

(4) an n-bit TOTAL zone; and (5) a unit zone $U_1$ which, in conjunction with the TOTAL zone, allows the initial total in the data carrier to be known.

If for example, the unit zone indicates 100 Dollars, the initial total which the recording carrier is able to contain will $(2^n-1) \times 100$ Dollars.

The financial memory is situated in the working zone in Part 1 of the physical memory between addresses ADT and ADL (FIG. 4A). The debits are recorded directly starting from address ADT in the ascending address direction. Credits are recorded in the descending address direction starting from address ADL and in this way debits and credits gradually fill up the memory as they advance towards one another.

Figure 5:
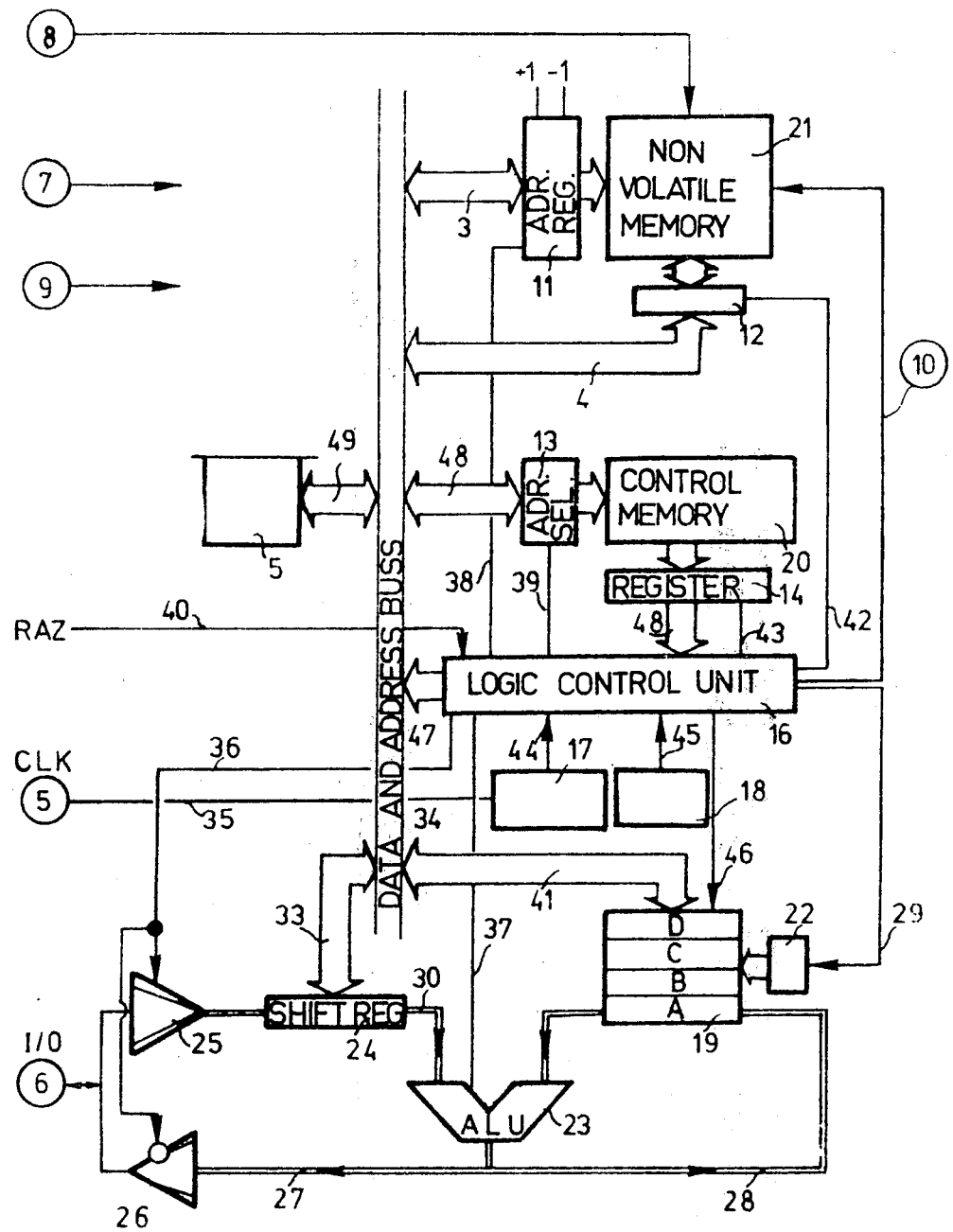
FIG. 5 is a detailed view of the circuits shown in FIGS. 1 and 2.

FIG. 5 is a detailed view of the circuits indicated in FIGS. 1 and 2. In this Figure, the incoming or outgoing data appears in serial binary form at terminal 6 of the data carrier. It enters the data carrier through a transmission gate 25 and is stored in a shift register 24, transmission gate 25 being controlled by a signal which travels along a line 36 connecting transmission gate 25 to a logic control unit 16. Data leaves the data carrier through another transmission gate 26, which is also controlled by the signal on the line 36. As indicated by the state circle on the gate 26, the transmission gates 25 and 26 are activated at opposite times by the line 36.

The data contained in the shift register 24 is then used as a first operand for an arithmetic logic operation performed in an arithmetic logic unit 23 which is controlled by a control signal emitted by the logic control unit 16 along a line 37. The second operand is found in one of the registers A, B, C or D of a register bank 19 which is addressed by an address selector 22, the latter being controlled by the logic control unit 16 via a line 29. The result of an operation performed by the arithmetic logic unit is transmitted either to register A in the register bank 19 or I/O terminal 6 of the data carrier through transmission gate 26.

The registers A, B, C and D may also be loaded from a data and address buss 34 via a buss 41 under the control of the logic control unit 16 by means of a control line 46.

The data and address buss 34 is also connected by a bidirectional data buss 33 to the shift register 24, which can thus be loaded or read out at its parallel inputs/outputs.

Microinstructions are contained in a control memory 20 of the read-only memory (ROM) type. An address selector 13 addresses these microinstructions, which are then read out through a register 14 and a buss 48, to be retransmitted by the logic control unit 16.

A non-volatile memory 21 is addressed by an address register 11 which is loaded from the data and address buss 34 via a buss 3. The address register 11 points to data words in the memory 21.

The address register 11 is controlled by a control signal which is transmitted along a line 38 from the logic control unit 16. Under the control of the logic control unit 16, the address contained in register 11 may be incremented or decremented automatically by the clock signal (CLK) supplied to terminal 5 of the data carrier. The data read out from memory 21 is transmitted to the data and address buss 34 via a data register 12 under the control of the logic control unit 16 by means of a control line 42.

Considered in isolation, all of the elements of FIG. 5 will be well known to those skilled in the art of microprocessors, and they are accordingly not further described in detail herein.

Given the applications envisaged, the functions of the arrangement shown in FIG. 5 may be summarized as follows:

(1) sequential reading and writing of memory 21 in the authorized zones starting from a given address;

(2) acquisition and checking of an enabling key by comparing it with a word which is written in a secret zone of the application memory, and therefore inaccessible from outside the data carrier;

(3) authorization or forbidding of reading and writing;

(4) systematic self-checking of the writing in the memory;

(5) ordering internal storage of errors and/or successful attempts at access; and (6) disablement of the previous functions when the number of errors is that set in Part 0.

FIGS. 6 and 7 illustrate the operation in the memory read out mode. In the timing diagram of FIG. 6, the zero reset signal RAZ initializes the logic control unit 16 (FIG. 5), which authorizes the transfer of the message arriving along the serial I/O line (terminal 6) to the shift register 24.

The read out order takes the form of a signal SYNC which precedes the operation code CODOP and the address bits AD. The particular codes employed are determined for each specific application.

The CODOP order and the address are received by the processing unit which, by testing the work CODOP and the bits LP, has to recognize whether a reading operation is involved and whether the reading is protected or simply authorized. In the flow chart of FIG. 7, the acquisition of the message CODOP=AD occurs in step 501, and the test takes place in steps 502 and 504. If the operation is an unprotected read operation, the address register 11 (FIG. 5) is loaded in step 510 with the address word which follows the transmission of CODOP along the I/O line, then, in step 511, tests are carried out to check that the read address is in fact situated in the authorized memory zone. In particular, the microprogram recorded in the control memory 20 checks that the address word received is higher than the address ADT since external reading is only authorized in Parts 1 and 2 of the physical memory. If the address is higher than address ADT, the data is then read from memory 21 and loaded into the data register 12 so as to be transmitted via buss 34 to be output at the I/O terminal 6.

In step 513 the microprogram increments or decrements the address register 11 by one unit, depending upon the content of code CODOP, and then loops back to step 510. If address AD is lower than address ADT (Address in Part 0), the address register 11 is incremented by one unit until its content reaches the value ADT. In this way the whole of the memory except Part 0 can be read by an apparatus connected to the data carrier in the ascending or descending address direction.

If the reading is protected, the tests performed on the "CODOP" and the LP bits should coincide and in this case it is necessary for a key to be acquired in step 505. In the case of an application where two keys are required, the content of the CODOP code specifies the type of key wich must be used if the reading operation is to take place. In step 506, the key received from the I/O line is compared with one of the two keys contained in the identifying memory. If they coincide, the transmitted key is correct and a bit is recorded in the ACCESS memory (step 507). A check on the writing of this bit is then made in step 508. If the bit has not been written, a return is made to step 507.

As soon as the writing has in fact taken place, tests are performed on the DEBAC, ERROR and FULL zones in step 509 to check whether the data carrier is still valid. In the event of the data carrier not being valid, a code 000 will be transmitted along the I/O line. If the carrier is recognized by the microprogram, the address AD is fed into the address register 11 and steps 510 to 513 are executed.

In cases where the key received from the I/O line proves incorrect in step 506, an error bit is stored in the ERROR zone of the memory (step 514). When the error bit is written, a test takes place in step 515 to check whether or not the number of errors recorded (E) is greater than the permitted number of errors (N). If E is smaller than N, a message FFF is transmitted along the I/O line. If E is greater or equal to N, the message 000 is transmitted along the I/O line and the data carrier is invalidated.

From the process of reading the data carrier which has just been described, it can be seen that the user never sees any change in the operation of the data carrier whether the access key used is correct or incorrect. In addition, writing an access bit of an error bit into the memory in one or other of the two eventualities (key correct or key incorrect) always results in the data carrier consuming the same amount of electrical current and because of this a would-be defrauder attempting to monitor the strength of current to the card will always see a constant consumption whether the key used is correct or incorrect.

Figure 9:
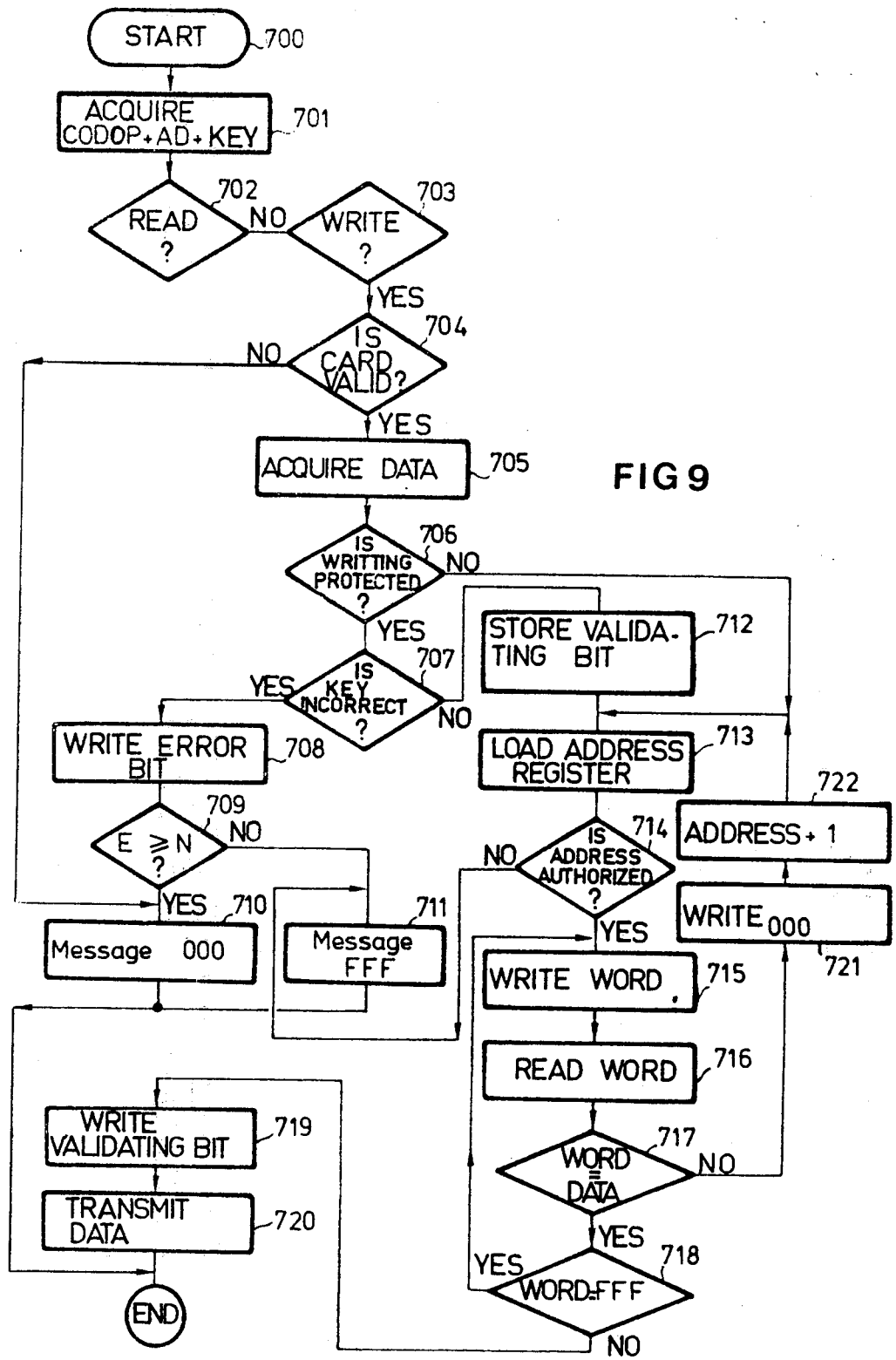

FIGS. 8 and 9 illustrate the operation of the data carrier in the memory read out mode. In the timing diagram of FIG. 8, the zero reset signal RAZ initializes the logic control unit 16 and initiates the transfer of the data present on the I/O line to the shift register 24. The write order takes the form of a signal SYNC preceding an operation code "CODOP" which is followed by data address bits AD and a key if the writing is protected. A signal is then transmitted to enable the data to be written into the memory 21 of the data carrier. So that the user can be certain that the data transmitted along the I/O line has in fact been recorded in the data carrier, the data written into the memory is read out again and retransmitted to the user along the I/O line. The code "CODOP" is of course specific to each application.

In the flow chart of FIG. 9, the order CODOP and the address AD, which may or may not be followed by a key, are recognized by the data carrier by means of a test which takes place in steps 702 and 703. In step 704, a test for the validity of the data carrier is performed on zones DEBE, DEBAC and FULL. If the data carrier is recognized as valid, acquisition of the data takes place in step 705.

Whether the writing is protected is determined in step 706. If the writing involved is protected, it is necessary for a key to be used and a test is performed on the key in step 707. If the key is incorrect, an error bit is written into the ERROR zone of the memory (step 708) and then a test is performed in step 709 to check whether or not the error zone has overflowed. In cases where it has overflowed, E is greater than or equal to N and the data carrier transmits the code 000 along the I/O line to indicate that the card is invalid (step 710). In cases where it has not overflowed, E is less than N and the data carrier emits the message FFF along the I/O line (step 711) to indicate that the data has not been written.

If the key is correct, a validating bit is stored in step 712 and the address received is loaded into address register 11 at step 713. A check then takes place in stage 714 to ascertain whether the address received is within the permitted limits of the physical memory, i.e., is between the addresses ADL and ADT. If this is not the case, the code FFF is transmitted along the I/O line (step 711) to indicate that the data has not been recorded in the memory. In cases where the address is permitted, the data received along the I/O line is transmitted to the data register 12 to be written into Part 1 of the memory (step 715). A check takes place in stages 716, 717 and 718 to ascertain whether the data has in fact been written into the memory. In step 719, a validating bit is written into the memory once the data has been written. In step 720, the written data is transmitted again along the I/O line.

Although the main features of the invention have been described in the foregoing and shown in the drawings as applied to a preferred embodiment of the invention, it is realized that numerous modifications and changes will occur to those skilled in the art. It is therefore to be understood that the appended claims are intended to cover all such modifications and changes as fall within the true spirit and scope of the invention.

What is claimed is:

1. A portable data carrier for storing and processing data, comprising:
    a microprocessor,
    a memory operatively associated with said microprocessor having a first zone to which access by devices external to said carrier is prevented, and in which reading and writing by circuits internal to said carrier are permitted;
    said microprocessor including internal first means for reading and writing in said memory; second means for receiving external data to be written in said memory, and third means for externally transmitting data read from said memory,
    said first means internal to said portable data including means for checking an enabling key received from a device external to said carrier,
    and said portable data carrier further comprising means associated with said reading element for storing error information in a zone of said memory in the event the received key is incorrect; and
    means associated with said reading element for storing access information in another zone of said memory in the event the received key is correct.

2. A portable data carrier for storing and processing data, comprising:
    a microprocessor,
    a memory operatively associated with said microprocessor having a first zone to which access by devices external to said carrier is prevented, and in which reading and writing by circuit internal to said carrier are permitted,
    said microprocessor including internal first means for reading and writing in said memory; second means for receiving external data to be written in said memory, and third means for externally transmitting data read from said memory,
    said first means internal to said portable data including means for checking an enabling key received from a device external to said carrier,
    and said portable data carrier further comprising means associated with said writing element for storing error information in a zone of said memory in the event the received key in incorrect; and
    means associated with said writing element for storing validity information in another zone of said memory in the event the received key is correct.

3. A portable data carrier as set forth in claim 2, wherein said portable data carrier further comprising means associated with said reading element for storing error information in a zone of said memory in the event the received key in incorrect; and
    means associated with said element for storing access information in another zone of said memory in the event the received key is correct.

* * * * *